US009163691B2

(12) United States Patent
Roessle et al.

(10) Patent No.: US 9,163,691 B2
(45) Date of Patent: Oct. 20, 2015

(54) ROD GUIDE ARRANGEMENT FOR ELECTRONICALLY CONTROLLED VALVE APPLICATIONS

(71) Applicant: Tenneco Automotive Operating Company Inc., Lake Forest, IL (US)

(72) Inventors: Matthew L. Roessle, Temperance, MI (US); Karl C. Kazmirski, Temperance, MI (US); Thomas P. Mallin, Temperance, MI (US); John McGahey, Trenton, MI (US); Timothy Bombrys, Bowling Green, OH (US); David R. Blankenship, Canton, MI (US); Jeroen K. Paenhuysen, Ypsilanti, MI (US)

(73) Assignee: Tenneco Automotive Operating Company Inc., Lake Forest, IL (US)

( * ) Notice: Subject to any disclaimer, the term of this patent is extended or adjusted under 35 U.S.C. 154(b) by 31 days.

(21) Appl. No.: 13/947,169

(22) Filed: Jul. 22, 2013

(65) Prior Publication Data

US 2014/0262652 A1    Sep. 18, 2014

Related U.S. Application Data

(60) Provisional application No. 61/786,682, filed on Mar. 15, 2013.

(51) Int. Cl.
```
F16F 9/36      (2006.01)
F16F 9/18      (2006.01)
F16F 9/46      (2006.01)
```
(52) U.S. Cl.
CPC ............... *F16F 9/185* (2013.01); *F16F 9/362* (2013.01); *F16F 9/464* (2013.01)

(58) Field of Classification Search
CPC ............. F16F 9/46; F16F 9/463; F16F 9/464; F16F 9/466; B60G 2400/252
USPC ............................................. 188/315, 322.17
See application file for complete search history.

(56) References Cited

U.S. PATENT DOCUMENTS

| 4,552,324 A | 11/1985 | Hrusch |
| 4,589,528 A | 5/1986 | Axthammer et al. |

(Continued)

FOREIGN PATENT DOCUMENTS

| DE | 3928343 A1 | 2/1991 |
| DE | 19853277 C1 | 5/2000 |

(Continued)

OTHER PUBLICATIONS

Search Report and Written Opinion in corresponding PCT Application No. PCT/US2014/019307 dated May 27, 2014 (12 pages).

*Primary Examiner* — Bradley King
*Assistant Examiner* — Stephen Bowes
(74) *Attorney, Agent, or Firm* — Harness, Dickey & Pierce, P.L.C.

(57) ABSTRACT

A shock absorber has a housing with a piston rod assembly disposed therein. A first rod guide member is secured within a first portion of the housing so as to be concentrically disposed about at least a portion of the piston rod assembly. A second rod guide member is secured within the housing adjacent the first rod guide member so as to be concentrically disposed about at least another portion of the piston rod assembly. An electronically controlled valve assembly is disposed within the second rod guide member and is in communication with the first rod guide member.

22 Claims, 8 Drawing Sheets

(56) References Cited

U.S. PATENT DOCUMENTS

| | | | |
|---|---|---|---|
| 4,749,070 A * | 6/1988 | Moser et al. | 188/266.2 |
| 4,788,489 A * | 11/1988 | Kobayashi et al. | 324/660 |
| 4,846,317 A | 7/1989 | Hudgens | |
| 4,850,460 A | 7/1989 | Knecht et al. | |
| 4,867,476 A | 9/1989 | Yamanaka et al. | |
| 4,872,537 A | 10/1989 | Warner | |
| 4,892,328 A | 1/1990 | Kurtzman et al. | |
| 4,909,536 A | 3/1990 | Hale | |
| 4,958,706 A | 9/1990 | Richardson et al. | |
| 4,969,662 A | 11/1990 | Stuart | |
| 4,973,854 A | 11/1990 | Hummel | |
| 4,986,393 A | 1/1991 | Preukschat et al. | |
| 5,038,613 A | 8/1991 | Takenaka et al. | |
| 5,133,434 A | 7/1992 | Kikushima et al. | |
| 5,143,185 A | 9/1992 | Klein et al. | |
| 5,154,442 A | 10/1992 | Milliken | |
| 5,189,614 A | 2/1993 | Mitsuoka et al. | |
| 5,200,895 A | 4/1993 | Emura et al. | |
| 5,293,968 A | 3/1994 | Schuelke et al. | |
| 5,299,488 A | 4/1994 | Kadlicko et al. | |
| 5,350,187 A | 9/1994 | Shinozaki | |
| 5,350,983 A | 9/1994 | Miller et al. | |
| 5,360,089 A | 11/1994 | Nakamura et al. | |
| 5,363,945 A | 11/1994 | Lizell et al. | |
| 5,383,679 A | 1/1995 | Nakamura et al. | |
| 5,396,973 A * | 3/1995 | Schwemmer et al. | 188/267.1 |
| 5,404,973 A | 4/1995 | Katoh et al. | |
| 5,430,648 A | 7/1995 | Sasaki | |
| 5,485,417 A | 1/1996 | Wolf et al. | |
| 5,487,455 A | 1/1996 | Feigel | |
| 5,497,325 A | 3/1996 | Mine | |
| 5,497,862 A | 3/1996 | Hoya | |
| 5,532,921 A | 7/1996 | Katsuda | |
| 5,570,762 A | 11/1996 | Jentsch et al. | |
| 5,597,054 A | 1/1997 | Nagai et al. | |
| 5,632,503 A | 5/1997 | Raad et al. | |
| 5,653,315 A | 8/1997 | Ekquist et al. | |
| 5,655,633 A | 8/1997 | Nakadate et al. | |
| 5,690,195 A | 11/1997 | Kruckemeyer et al. | |
| 5,725,239 A | 3/1998 | de Molina | |
| 5,775,470 A | 7/1998 | Feigel | |
| 5,803,482 A | 9/1998 | Kim | |
| 5,833,036 A * | 11/1998 | Gillespie | 188/285 |
| 5,860,497 A | 1/1999 | Takahashi | |
| 5,878,851 A | 3/1999 | Carlson et al. | |
| 5,913,391 A | 6/1999 | Jeffries et al. | |
| 5,937,976 A | 8/1999 | Grundei | |
| 5,950,775 A | 9/1999 | Achmad | |
| 5,967,268 A | 10/1999 | de Molina et al. | |
| 5,987,369 A | 11/1999 | Kwak et al. | |
| 6,003,644 A | 12/1999 | Tanaka | |
| 6,036,500 A | 3/2000 | Francis et al. | |
| 6,109,400 A | 8/2000 | Ayyildiz et al. | |
| 6,155,391 A | 12/2000 | Kashiwagi et al. | |
| 6,213,262 B1 | 4/2001 | Bell | |
| 6,273,224 B1 | 8/2001 | Achmad | |
| 6,296,091 B1 | 10/2001 | Hamilton | |
| 6,302,248 B1 | 10/2001 | Nakadate | |
| 6,321,888 B1 | 11/2001 | Reybrouck et al. | |
| 6,343,677 B2 | 2/2002 | Bell | |
| 6,427,986 B1 | 8/2002 | Sakai et al. | |
| 6,460,664 B1 | 10/2002 | Steed et al. | |
| 6,533,294 B1 | 3/2003 | Germain et al. | |
| 6,588,726 B2 | 7/2003 | Osterhart et al. | |
| 6,616,124 B2 | 9/2003 | Oliver et al. | |
| 6,651,787 B2 | 11/2003 | Grundei | |
| 6,655,512 B2 | 12/2003 | Moradmand et al. | |
| 6,672,436 B1 | 1/2004 | Keil et al. | |
| 6,708,803 B2 | 3/2004 | Jensen | |
| 6,814,193 B2 | 11/2004 | Grundei | |
| 6,851,528 B2 | 2/2005 | Lemieux | |
| 6,879,898 B2 | 4/2005 | Ghoneim et al. | |
| 6,904,344 B2 | 6/2005 | LaPlante et al. | |
| 6,959,797 B2 | 11/2005 | Mintgen et al. | |
| 6,964,325 B2 | 11/2005 | Maes | |
| 6,978,872 B2 | 12/2005 | Turner | |
| 7,032,912 B2 | 4/2006 | Nicot et al. | |
| 7,168,709 B2 | 1/2007 | Niwa et al. | |
| 7,234,574 B2 | 6/2007 | Matsunaga et al. | |
| 7,234,707 B2 | 6/2007 | Green et al. | |
| 7,273,138 B2 | 9/2007 | Park | |
| 7,286,919 B2 | 10/2007 | Nordgren et al. | |
| 7,318,595 B2 | 1/2008 | Lamela et al. | |
| 7,347,307 B2 * | 3/2008 | Joly | 188/266.5 |
| 7,374,028 B2 | 5/2008 | Fox | |
| 7,389,994 B2 | 6/2008 | Trudeau et al. | |
| 7,413,062 B2 | 8/2008 | Vandewal | |
| 7,416,189 B2 | 8/2008 | Wilde et al. | |
| 7,475,538 B2 | 1/2009 | Bishop | |
| 7,493,995 B2 | 2/2009 | Sas et al. | |
| 7,604,101 B2 | 10/2009 | Park | |
| 7,611,000 B2 | 11/2009 | Naito | |
| 7,628,253 B2 | 12/2009 | Jin et al. | |
| 7,644,933 B2 | 1/2010 | Brookes et al. | |
| 7,654,369 B2 | 2/2010 | Murray et al. | |
| 7,654,370 B2 | 2/2010 | Cubalchini, Jr. | |
| 7,680,573 B2 | 3/2010 | Ogawa | |
| 7,722,405 B2 | 5/2010 | Jaklin et al. | |
| 7,770,983 B2 | 8/2010 | Park | |
| 7,775,333 B2 | 8/2010 | Or et al. | |
| 7,849,983 B2 | 12/2010 | St. Clair et al. | |
| 7,878,311 B2 | 2/2011 | Van Weelden et al. | |
| 7,896,311 B2 | 3/2011 | Jee | |
| 7,912,603 B2 | 3/2011 | Stiller et al. | |
| 7,926,513 B2 | 4/2011 | Ishibashi et al. | |
| 7,931,282 B2 | 4/2011 | Kolp et al. | |
| 7,942,248 B2 | 5/2011 | St. Clair et al. | |
| 7,946,163 B2 | 5/2011 | Gartner | |
| 7,946,399 B2 | 5/2011 | Masamura | |
| 7,967,116 B2 | 6/2011 | Boerschig | |
| 7,967,117 B2 | 6/2011 | Abe | |
| 7,992,692 B2 | 8/2011 | Lee et al. | |
| 7,997,394 B2 | 8/2011 | Yamaguchi | |
| 8,056,392 B2 | 11/2011 | Ryan et al. | |
| 8,075,002 B1 | 12/2011 | Pionke et al. | |
| 8,116,939 B2 | 2/2012 | Kajino et al. | |
| 8,132,654 B2 | 3/2012 | Widla et al. | |
| 8,136,644 B2 | 3/2012 | Sonsterod | |
| 8,160,774 B2 | 4/2012 | Li et al. | |
| 8,214,106 B2 | 7/2012 | Ghoneim et al. | |
| 8,267,382 B2 * | 9/2012 | Yazaki et al. | 267/64.17 |
| 8,393,446 B2 | 3/2013 | Haugen | |
| 8,430,217 B2 | 4/2013 | Hennecke et al. | |
| 8,567,575 B2 | 10/2013 | Jung et al. | |
| 8,616,351 B2 | 12/2013 | Roessle et al. | |
| 8,666,596 B2 | 3/2014 | Arenz | |
| 8,684,367 B2 | 4/2014 | Haugen | |
| 8,695,766 B2 | 4/2014 | Yamashita et al. | |
| 8,794,405 B2 | 8/2014 | Yamashita et al. | |
| 8,844,687 B2 | 9/2014 | Yu et al. | |
| 2002/0133277 A1 | 9/2002 | Koh | |
| 2003/0164193 A1 | 9/2003 | Lou | |
| 2003/0192755 A1 * | 10/2003 | Barbison et al. | 188/322.13 |
| 2004/0090020 A1 | 5/2004 | Braswell | |
| 2004/0199313 A1 | 10/2004 | Dellinger | |
| 2005/0029063 A1 | 2/2005 | Neumann | |
| 2005/0056502 A1 | 3/2005 | Maes | |
| 2005/0067242 A1 * | 3/2005 | Vanmechelen et al. | 188/322.17 |
| 2005/0085969 A1 | 4/2005 | Kim | |
| 2005/0113997 A1 | 5/2005 | Kim | |
| 2005/0173849 A1 | 8/2005 | Vandewal | |
| 2006/0038149 A1 | 2/2006 | Albert et al. | |
| 2006/0124415 A1 | 6/2006 | Joly | |
| 2006/0219503 A1 | 10/2006 | Kim | |
| 2007/0034466 A1 | 2/2007 | Paesmans et al. | |
| 2007/0051574 A1 | 3/2007 | Keil et al. | |
| 2008/0054537 A1 | 3/2008 | Harrison | |
| 2008/0243336 A1 | 10/2008 | Fitzgibbons | |
| 2008/0250844 A1 | 10/2008 | Gartner | |
| 2008/0277218 A1 | 11/2008 | Fox | |
| 2009/0078517 A1 | 3/2009 | Maneyama et al. | |
| 2009/0084647 A1 | 4/2009 | Maneyama et al. | |
| 2009/0132122 A1 | 5/2009 | Kim et al. | |
| 2009/0192673 A1 | 7/2009 | Song et al. | |

(56) References Cited

U.S. PATENT DOCUMENTS

| | | |
|---|---|---|
| 2010/0001217 A1 | 1/2010 | Jee et al. |
| 2010/0044172 A1 | 2/2010 | Jee et al. |
| 2010/0066051 A1 | 3/2010 | Haugen |
| 2010/0163354 A1 | 7/2010 | Braun |
| 2010/0181154 A1 | 7/2010 | Panichgasem |
| 2010/0191420 A1 | 7/2010 | Honma et al. |
| 2010/0211253 A1 | 8/2010 | Morais Dos Santos et al. |
| 2011/0035091 A1 | 2/2011 | Yamamoto |
| 2011/0056783 A1 | 3/2011 | Teraoka et al. |
| 2011/0079475 A1 | 4/2011 | Roessle et al. |
| 2011/0101579 A1 | 5/2011 | Polakowski et al. |
| 2011/0198172 A1 | 8/2011 | Whan |
| 2011/0240424 A1 | 10/2011 | Beck |
| 2011/0298399 A1 | 12/2011 | Ogawa et al. |
| 2012/0018263 A1 | 1/2012 | Marking |
| 2012/0048665 A1 | 3/2012 | Marking |
| 2012/0181126 A1 | 7/2012 | de Kock |
| 2012/0186922 A1 | 7/2012 | Battlogg et al. |
| 2012/0228072 A1 | 9/2012 | Mangelschots et al. |
| 2013/0090808 A1 | 4/2013 | Lemme et al. |
| 2013/0234379 A1 | 9/2013 | Panichgasem |
| 2013/0313057 A1 | 11/2013 | Tsukahara et al. |
| 2013/0328277 A1 | 12/2013 | Ryan et al. |
| 2013/0340865 A1 | 12/2013 | Manger et al. |
| 2013/0341842 A1 | 12/2013 | Weber |
| 2014/0125018 A1 | 5/2014 | Brady et al. |
| 2014/0202808 A1 | 7/2014 | Spyche, Jr. et al. |
| 2014/0231200 A1 | 8/2014 | Katayama |
| 2014/0238797 A1 | 8/2014 | Blankenship et al. |
| 2014/0239602 A1 | 8/2014 | Blankenship et al. |
| 2014/0244112 A1 | 8/2014 | Dunaway et al. |

FOREIGN PATENT DOCUMENTS

| | | |
|---|---|---|
| DE | 10238657 A1 | 3/2004 |
| EP | 1588072 A1 | 10/2005 |
| EP | 1746302 A1 | 1/2007 |
| GB | 2123922 A | 2/1984 |
| JP | 61125907 | 6/1986 |
| JP | 62-253506 | 11/1987 |
| JP | 06-026546 | 2/1994 |
| JP | 07-113434 | 5/1995 |
| JP | 7056311 | 6/1995 |
| JP | 08-260747 | 10/1996 |
| JP | 09-217779 | 8/1997 |
| JP | 2002-349630 A | 12/2002 |
| WO | WO 92/18788 | 10/1992 |

* cited by examiner

ROD GUIDE ARRANGEMENT FOR ELECTRONICALLY CONTROLLED VALVE APPLICATIONS

CROSS-REFERENCE TO RELATED APPLICATIONS

This application claims the benefit of U.S. Provisional Application No. 61/786,682, filed on Mar. 15, 2013. The entire disclosure of the above application is incorporated herein by reference.

FIELD

The present disclosure relates generally to hydraulic dampers or shock absorbers for use in a suspension system such as a suspension system used for automotive vehicles. More particularly, the present disclosure relates to an improved rod guide assembly for a shock absorber.

BACKGROUND

This section provides background information related to the present disclosure which is not necessarily prior art.

Shock absorbers are used in conjunction with automotive suspension systems to absorb unwanted vibrations that occur during driving. To absorb the unwanted vibrations, shock absorbers are generally connected between the sprung portion (body) and the unsprung portion (suspension) of the automobile. A piston is located within a pressure tube of the shock absorber and the pressure tube is connected to the unsprung portion of the vehicle. The piston is connected to the sprung portion of the automobile through a piston rod which extends through the pressure tube. The piston divides the pressure tube into an upper working chamber and a lower working chamber, both of which are filled with hydraulic fluid. Because the piston, through valving, is able to limit the flow of the hydraulic fluid between the upper and the lower working chambers when the shock absorber is compressed or extended, the shock absorber is able to produce a damping force which counteracts the vibration which would otherwise be transmitted from the unsprung portion to the sprung portion of the vehicle. In a dual-tube shock absorber, a fluid reservoir or reserve chamber is defined between the pressure tube and a reserve tube. A base valve is located between the lower working chamber and the reserve chamber to also produce a damping force which counteracts the vibrations which would otherwise be transmitted from the unsprung portion of the vehicle to the sprung portion of the automobile.

As described above, for a dual-tube shock absorber, the valving on the piston limits the flow of damping fluid between the upper and lower working chambers when the shock absorber is extended to produce a damping load. The valving on the base valve limits the flow of damping fluid between the lower working chamber and the reserve chamber when the shock absorber is compressed to produce a damping load. For a mono-tube shock absorber, the valving on the piston limits the flow of damping fluid between the upper and lower working chambers when the shock absorber is extended or compressed to produce a damping load. During driving, the suspension system moves in jounce (compression) and rebound (extension). During jounce movements, the shock absorber is compressed, causing damping fluid to move through the base valve in a dual-tube shock absorber or through the piston valve in a mono-tube shock absorber. A damping valve located on the base valve or the piston controls the flow of damping fluid and, thus, controls the damping force created.

During rebound movements, the shock absorber is extended causing damping fluid to move through the piston in both the dual-tube shock absorber and the mono-tube shock absorber. A damping valve located on the piston controls the flow of damping fluid and, thus, controls damping force created.

In a dual-tube shock absorber, the piston and the base valve normally include a plurality of compression passages and a plurality of extension passages. During jounce or compression movements in a dual-tube shock absorber, the damping valve or the base valve opens the compression passages in the base valve to control fluid flow and produce a damping load. A check valve on the piston opens the compression passages in the piston to replace damping fluid in the upper working chamber, but this check valve does not contribute to the damping load. The damping valve on the piston closes the extension passages of the piston and a check valve on the base valve closes the extension passages of the base valve during a compression movement. During rebound or extension movements in a dual-tube shock absorber, the damping valve on the piston opens the extension passages in the piston to control fluid flow and produce a damping load. A check valve on the base valve opens the extension passages in the base valve to replace damping fluid in the lower working chamber, but this check valve does not contribute to the damping load.

In a mono-tube shock absorber, the piston normally includes a plurality of compression passages and a plurality of extension passages. The shock absorber will also include means for compensating for the rod volume flow of fluid as is well known in the art. During jounce or compression movements in a mono-tube shock absorber, the compression damping valve on the piston opens the compression passages in the piston to control fluid flow and produce a damping load. The extension damping valve on the piston closes the extension passages of the piston during a jounce movement. During rebound or extension movements in a mono-tube shock absorber, the extension damping valve on the piston opens the extension passages in the piston to control fluid flow and produce a damping load. The compression damping valve on the piston closes the compression passages of the piston during a rebound movement.

For most dampers, the damping valves are designed as a normal close/open valve. Because of this close/open design, these passive valve systems are limited in their ability to adjust the generated damping load in response to various operating conditions of the vehicle. Accordingly, some valves have been designed to include a bleed flow of damping fluid, such as in copending U.S. patent application Ser. No. 12/573,911. While this type of design works effectively, it requires high precision components that are manufactured with tight tolerances.

SUMMARY

This section provides a general summary of the disclosure, and is not a comprehensive disclosure of its full scope or all of its features.

A shock absorber includes a rod guide member for guiding motion of a piston rod assembly and for housing an electronically controlled valve assembly. The rod guide assembly includes a first rod guide member joined with a second rod guide member and secured within a housing of the shock absorber. The first and second rod guide members are manufacturable in a low precision, high output process.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
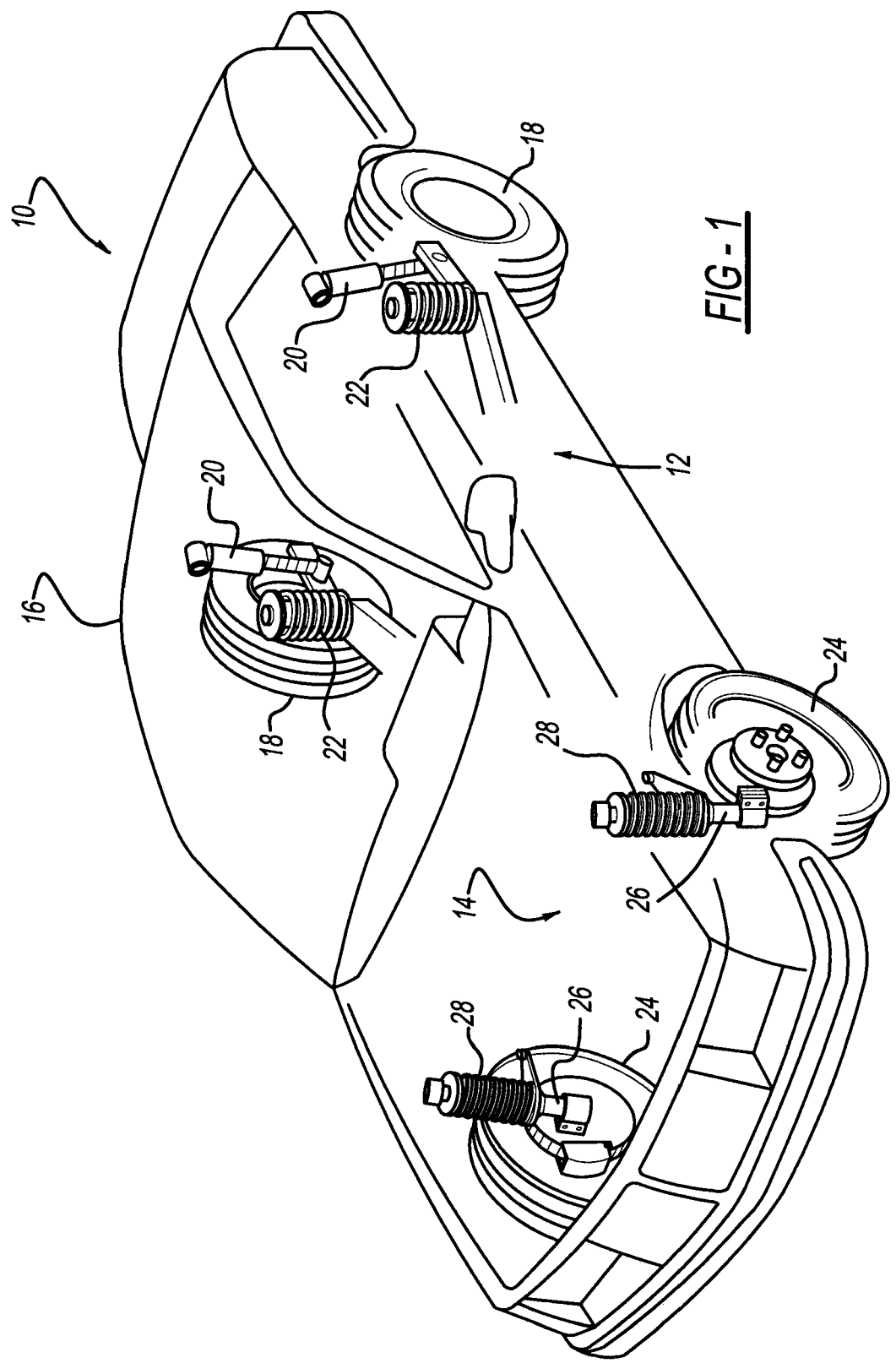
FIG. 1 is an illustration of an automobile having shock absorbers which incorporate a rod guide assembly in accordance with the present disclosure.

The following description is merely exemplary in nature and is not intended to limit the present disclosure, application, or uses. There is shown in FIG. 1, a vehicle incorporating a suspension system having shock absorbers in accordance with the present invention, and which is designated generally by the reference numeral 10. Vehicle 10 has been depicted as a passenger car having front and rear axle assemblies. However, shock absorbers in accordance with the present invention may be used with other types of vehicles or in other types of applications. Examples of these alternate arrangements include, but are not limited to, vehicles incorporating non-independent front and/or non-independent rear suspensions, vehicles incorporating independent front and/or independent rear suspensions or other suspension systems known in the art. Further, the term "shock absorber" as used herein is meant to refer to dampers in general and thus will include McPherson struts and other damper designs known in the art.

Vehicle 10 includes a rear suspension 12, a front suspension 14, and a body 16. Rear suspension 12 has a transversely extending rear axle assembly (not shown) adapted to operatively support a pair of rear wheels 18. The rear axle is attached to body 16 by means of a pair of shock absorbers 20 and by a pair of springs 22. Similarly, front suspension 14 includes a transversely extending front axle assembly (not shown) for operatively supporting a pair of front wheels 24. The front axle assembly is attached to body 16 by means of a pair of shock absorbers 26 and by a pair of springs 28. Shock absorbers 20, 26 serve to dampen the relative motion of the unsprung portion (i.e., rear and front suspensions 12, 14) with respect to the sprung portion (i.e., body 16) of vehicle 10.

Figure 2:
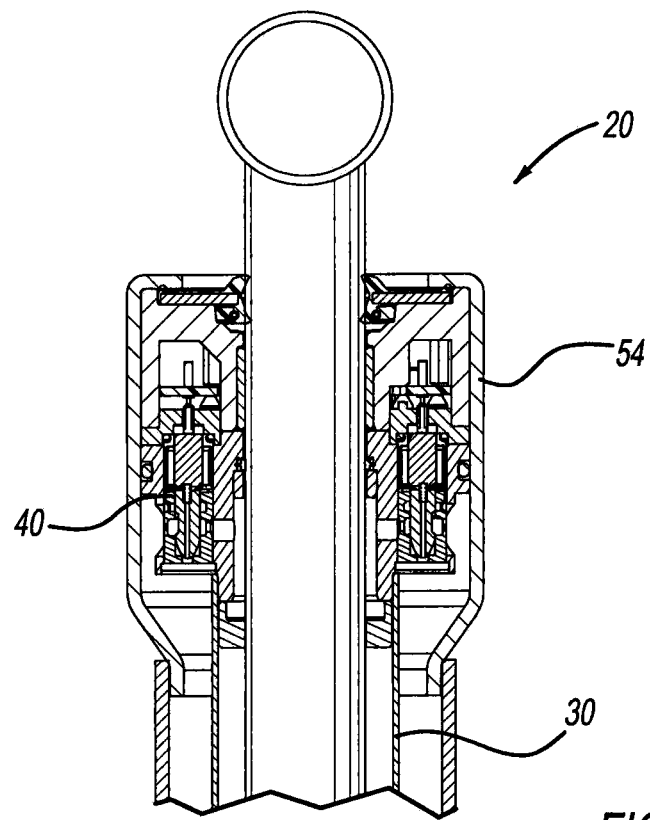
FIG. 2 is a side view, partially in cross-section of a dual-tube shock absorber that incorporates the rod guide assembly in accordance with the present disclosure.
Figure 2:
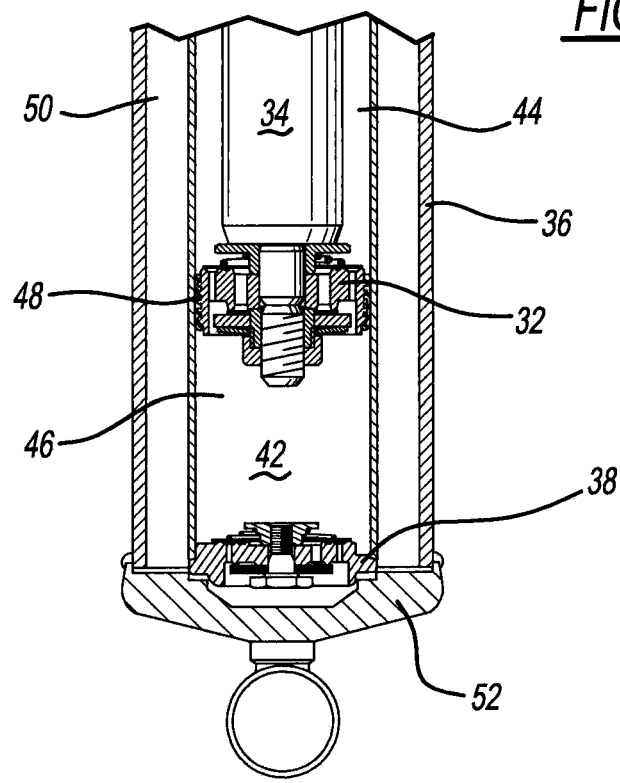

Referring now to FIG. 2, shock absorber 20 is shown in greater detail. While FIG. 2 illustrates only shock absorber 20, it is to be understood that shock absorber 26 is substantially similar to shock absorber 20. Shock absorber 26 only differs from shock absorber 20 in the manner in which it is adapted to be connected to the sprung and unsprung masses of vehicle 10. Shock absorber 20 comprises a pressure tube 30, a piston assembly 32, a piston rod 34, a reserve tube 36, a base valve assembly 38, and a rod guide assembly 40.

Pressure tube 30 defines a working chamber 42. Piston assembly 32 is slidably disposed within pressure tube 30 and divides working chamber 42 into an upper working chamber 44 and a lower working chamber 46. A seal 48 is disposed between piston assembly 32 and pressure tube 30 to permit sliding movement of piston assembly 32 with respect to pressure tube 30 without generating undue frictional forces. Seal 48 also works to seal upper working chamber 44 from lower working chamber 46. Piston rod 34 is attached to piston assembly 32 and extends through upper working chamber 44 and through rod guide assembly 40. The end of piston rod 34 opposite to piston assembly 32 is adapted to be secured to the sprung mass of vehicle 10. Valving within piston assembly 32 controls the movement of fluid between upper working chamber 44 and lower working chamber 46 during movement of piston assembly 32 within pressure tube 30. Movement of piston assembly 32 with respect to pressure tube 30 causes a difference in the amount of fluid displaced in upper working chamber 44 and the amount of fluid displaced in lower working chamber 46. This is primarily because piston rod 34 extends only through upper working chamber 44 and not through lower working chamber 46. The difference in the amount of fluid displaced is known as the "rod volume", which flows through base valve assembly 38.

Reserve tube 36 surrounds pressure tube 30 to define a fluid reservoir chamber 50 located between tubes 30, 36. The bottom end of reserve tube 36 is closed by a base cup 52 which is adapted to be connected to the unsprung mass of vehicle 10. The upper end of reserve tube 36 may extend to rod guide assembly 40 or reserve chamber 50 may be closed by an upper can 54, which in turn, is rolled-over rod guide assembly 40, as shown. Base valve assembly 38 is disposed between lower working chamber 46 and reservoir chamber 50 to control the flow of fluid between chambers 46, 50. When shock absorber 20 extends in length (i.e., when piston rod 34 moves upwardly and outwardly of upper can 54), an additional volume of fluid is needed in lower working chamber 46 due to the "rod volume" concept. Thus, fluid will flow from reservoir chamber 50 to lower working chamber 46 through base valve assembly 38. Conversely, when shock absorber 20 compresses in length (i.e., when piston rod 34 moves towards base valve assembly 38), an excess of fluid must be removed from lower working chamber 46 due to the "rod volume" concept. Thus, fluid will flow from lower working chamber 46 to reservoir chamber 50 through base valve assembly 38.

Figure 3:
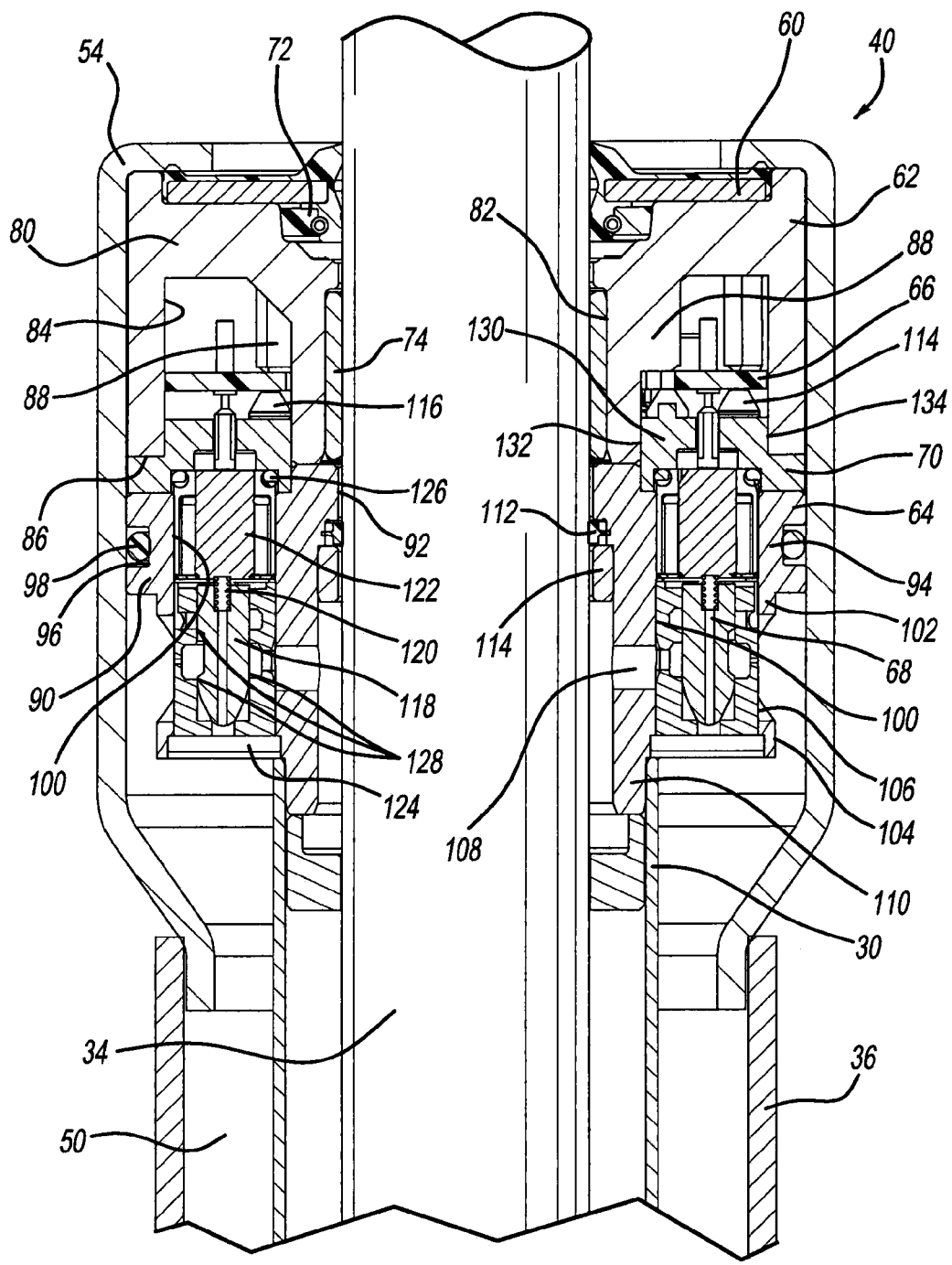
FIG. 3 is an enlarged side view, partially in cross-section of the rod guide assembly from the shock absorber illustrated in FIG. 2.

Referring now to FIG. 3, rod guide assembly 40 is illustrated in greater detail. Rod guide assembly 40 comprises a seal assembly 60, an upper rod guide 62, a lower rod guide 64, a circuit board 66, at least one electronically controlled valve assembly 68, and a retaining ring 70. Seal assembly 60 is assembled onto upper rod guide 62 so as to interface with upper can 54 and includes a check seal 72. Check seal 72 allows fluid to flow from the interface between piston rod 34 and an upper bushing 74 to reservoir chamber 50 through various fluid passages (not shown), but prohibits backwards fluid flow from reservoir chamber 50 to the interface between piston rod 34 and upper bushing 74. In one example, upper bushing 74 may be a Teflon coated bearing for slidably retaining piston rod 34.

Upper rod guide 62 may be initially assembled into upper can 54 or may be preassembled with lower rod guide 64 before installation into upper can 54. Upper can 54 may then be assembled to reserve tube 36 with pressure tube 30 assembled onto lower rod guide 64. In particular, pressure tube 30 and reserve tube 36 may be press-fit over upper can 54 and lower rod guide 64, respectively, so as to retain rod guide assembly 40 therewith.

Upper rod guide 62 may have a substantially tubular body 80 comprising a central aperture 82 extending therethrough and a concentric channel 84 extending from a lower surface 86 thereof. Upper rod guide 62 may be manufactured from a conventional forming process, such as, powder metal forming, metal injection molding (MIM), or other casting/forming processing. Upper rod guide 62 may accommodate seal assembly 60 at an upper portion of central aperture 82, while bushing 74 may be assembled at a lower portion of central aperture 82. Bushing 74 may be press-fit into upper rod guide 62 about central aperture 82 to accommodate the sliding motion of piston rod 34 while also providing a sealing surface for piston rod 34. Concentric channel 84 may be sized for receipt of at least circuit board 66 and may include a plurality of standoffs 88 for retaining circuit board 66 at a predefined location within upper rod guide 62.

Lower rod guide 64 may also have a substantially tubular body 90 comprising a central aperture 92 extending therethrough. Like upper rod guide 62, lower rod guide 64 may be manufactured from a conventional forming process, such as, powder metal forming, metal injection molding (MIM), or other casting/forming processing. Body 90 may have three distinct regions having consecutively smaller outer diameters for sealing against upper can 54, allowing for improved flow characteristics, and mating with pressure tube 30. For example, an upper region 94 of body 90 may have a first outer diameter correspondingly sized with an inner diameter of upper can 54. Upper region 94 may have a groove 96 extending about first outer diameter for receipt of a sealing ring or o-ring 98. A plurality of apertures 100 may extend through body 90 at upper region 94 so as to be concentrically arranged about central aperture 92. Apertures 100 may be sized for receipt of electronically controlled valve assemblies 68. Although four (4) electronically controlled valve assemblies 68 are shown for use in rod guide assembly 40, any number of electronically controlled valve assemblies 68 may be provided.

Apertures 100 may extend from upper region 94 to a central region 102 of body 90. Central region 102 may have an irregularly shaped outer surface 104, smaller in relative diameter than upper region 94. Outer surface 104 may closely track the location and configuration of apertures 100. Notably, outer surface 104 may be correspondingly arranged to track any selected number of electronically controlled valve assemblies 68. Central region 102 may have a plurality of openings 106 corresponding to the location of each electronically controlled valve assembly 68 for fluid communication between each electronically controlled valve assembly 68 and reservoir chamber 50. Furthermore, additional openings 108 may extend between apertures 100 and central aperture 92 in order to provide an additional fluid flow path. A lower region 110 may extend from central region 102 and may be shaped as a collar for receipt of pressure tube 30, as previously described.

Lower rod guide 64 may accommodate an upper seal ring 112 and a lower bushing 114 at central aperture 92 substantially above openings 106 so as not to interfere with flow characteristics. Seal ring 112 and bushing 114 may be press-fit into lower rod guide 64 about central aperture 92 to accommodate for the sliding motion of piston rod 34 while also providing an additional seal for piston rod 34. Seal ring 112 may be a T-seal or slip ring acting as a secondary seal by absorbing any radial clearance. Bushing 114 may behave as a collar or ledge for retaining seal ring 112 within central aperture 92.

Circuit board 66 may be disposed within channel 84 of upper rod guide 62 and may abut standoffs 88 as previously discussed. Circuit board 66 may include a plurality of isolators 116 securely retained on a surface opposite standoffs 88 for abutting retaining ring 70 and for supporting circuit board 66. Circuit board 66 may be used to provide power to actuate electronically controlled valve assemblies 68. For example, each electronically controlled valve assembly 68 may be a two position valve assembly which has a different flow area in each of the two positions. Each electronically controlled valve assembly 68 may have wiring connections for moving between the two positions, where the wiring connections extend to circuit board 66.

Electronically controlled valve assembly 68 may comprise an armature 118, a spring 120, and a coil assembly 122. Each armature 118 is slidingly received within lower rod guide 64 and axially travels within lower rod guide 64 between coil assembly 122 and a stop puck 124 disposed within lower rod guide 64. Spring 120 biases armature 118 away from coil assembly 122 and towards stop puck 124. An O-ring 126 seals the interface between coil assembly 122 and retaining ring 70. Armature 118 defines flanges 128 which control fluid flow between working chamber 42 and reservoir chamber 50. Coil assembly 122 is disposed within lower rod guide 64 to control the axial movement of armature 118. The wiring connections for coil assembly 122 extend to circuit board 66.

When there is no power provided to coil assemblies 122, the damping characteristics will be defined by the flow area of electronically controlled valve assemblies 68 in a first position. The movement of each armature 118 is controlled by supplying power to each coil assembly 122 to move electronically controlled valve assemblies 68 to a second position. Electronically controlled valve assemblies 68 can be kept in the second position by continuing to supply power to each coil assembly 122 or by providing means for retaining electronically controlled valve assemblies 68 in the second position and discontinuing the supply of power to coil assemblies 122. The means for retaining electronically controlled valve assemblies 68 in the second position can include mechanical means, magnetic means or other means known in the art.

Once in the second position, movement to the first position can be accomplished by terminating power to each coil assembly 122 or by reversing the current or reversing the polarity of the power supplied to each coil assembly 122 to overcome the retaining means. The amount of flow through each electronically controlled valve assembly 68 has discrete settings for flow control in both the first position and the second position. While the present disclosure is described using multiple electronically controlled valve assemblies 68, it is within the scope of the disclosure to use any number of electronically controlled valve assemblies 68.

It should be understood that when multiple electronically controlled valve assemblies 68 are used, each electronically controlled valve assembly 68 may have a different flow area in one or both positions. By having a different flow are in one or both positions, the total flow area through the plurality of electronically controlled valve assemblies 68 can be set at a specific number of total flow areas depending on the position of each individual electronically controlled valve assembly

68. Each electronic control valve can have a different flow area, the combinations thereof can determine the total flow area available.

Retaining ring 70 may be arranged between upper rod guide 62 and lower rod guide 64 for retaining the various electronically controlled valve assemblies 68. For example, retaining ring 70 may be press-fit into upper rod guide 62 as shown, or may be secured to either upper or lower rod guides 62, 64, such as with an adhesive. Retaining ring 70 may have a substantially tubular body 130 comprising a central aperture 132 extending therethrough. Body 130 may have a stepped profile 134 at an outer diameter thereof. In this way, a first portion of tubular body 130 may be arranged within channel 84 of upper rod guide 62, while a second portion of tubular body 130 may be arranged between upper rod guide 62 and lower rod guide 64. Apertures 100 may extend into body 130 so as to be concentrically aligned with apertures 100 in body 90 of lower rod guide 64.

Figure 4:
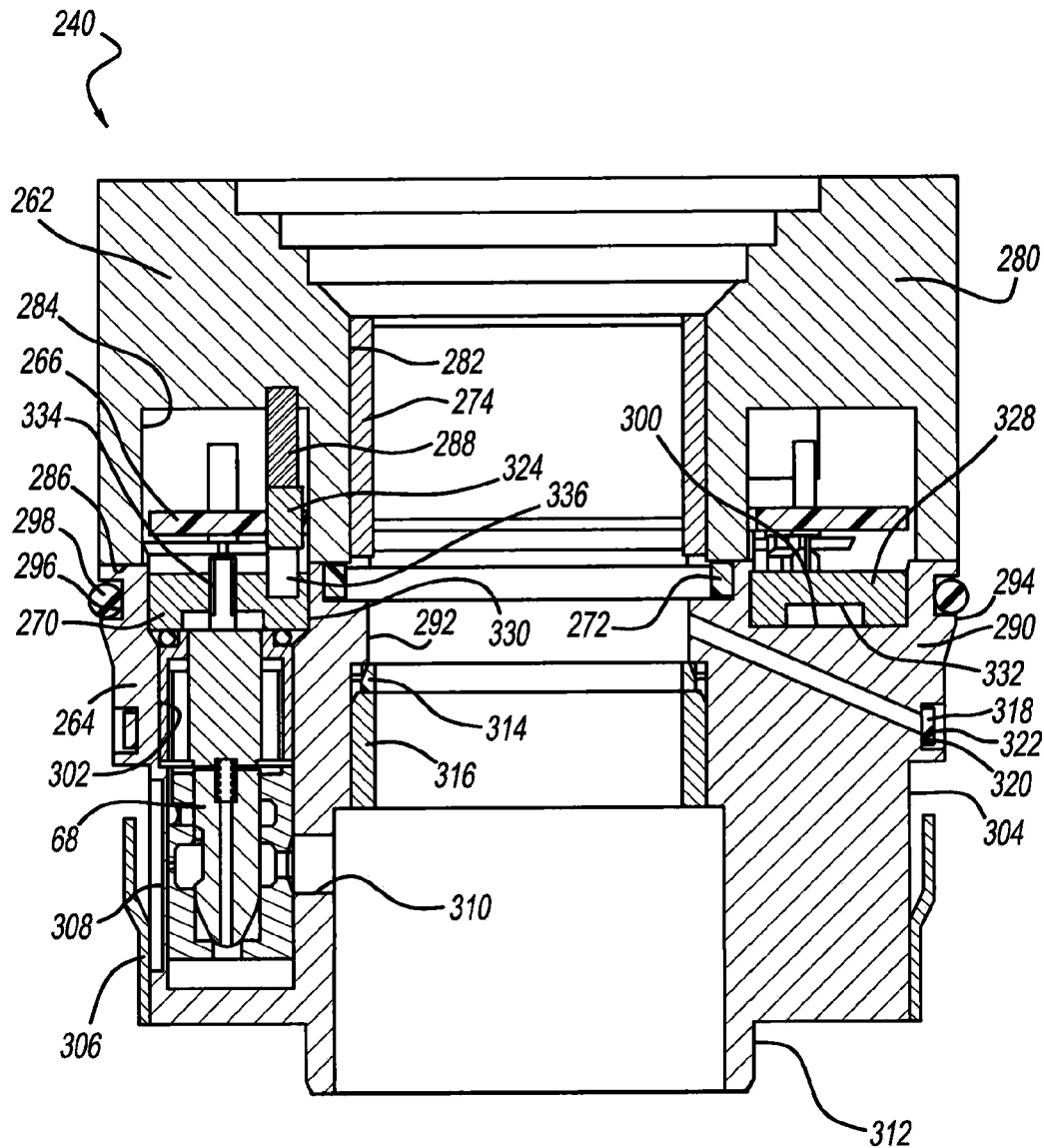
FIG. 4 is an enlarged side view in cross-section of a portion of a rod guide assembly in accordance with another embodiment of the present disclosure.

Referring now to FIG. 4, a rod guide assembly 240 is illustrated in greater detail. Rod guide assembly 240 can be used in place of rod guide assembly 40 in either the dual-tube shock absorber 20, 26 or mono-tube shock absorber 140 designs. For simplicity in description, only shock absorber 20 will be described hereinafter. Accordingly, various common parts are not shown and will not be described in detail again, such as seal assembly 60 and piston rod 34. Rod guide assembly 240 comprises an upper rod guide 262, a lower rod guide 264, a circuit board 266, at least one of electronically controlled valve assemblies 68, a retaining ring 270, and a square sealing ring 272. As should be understood, upper rod guide 262 and lower rod guide 264 may be manufactured from conventional forming processes, such as, powder metal forming, metal injection molding (MIM), or other casting/forming processing, as previously discussed.

Upper rod guide 262 may be assembled into shock absorber 20 or may be preassembled with lower rod guide 264 before installation into shock absorber 20, as previously described. Upper rod guide 262 may have an upper bushing 274 assembled into a substantially tubular body 280 at a central aperture 282 thereof (e.g., press-fit) to accommodate for the sliding motion of piston rod 34 while also providing for a seal for piston rod 34. A concentric channel 284 extending from a lower surface 286 of body 280 may be sized for receipt of at least circuit board 266 and may include a plurality of standoffs or dowel pins 288 inserted into a lower surface thereof. Dowel pins 288 may work to retain circuit board 266 at a predefined location within upper rod guide 262.

Lower rod guide 264 may also have a substantially tubular body 290 comprising a central aperture 292 extending therethrough. Body 290 may have an upper region 294 having a first outer diameter for sealing against an inner periphery of shock absorber 20. Upper region 294 may have a peripheral groove 296 for receipt of a sealing ring or O-ring 298. An upper groove 300 may extend through body 290 so as to be concentrically arranged about central aperture 292. Groove 300 may be sized for receipt of electronically controlled valve assemblies 68 and for retaining ring 270. Although four (4) electronically controlled valve assemblies 68 are shown for use in rod guide assembly 240, any number of electronically controlled valve assemblies 68 may be provided.

A plurality of apertures 302 may extend from upper region 294 to a lower region 304 of body 290 having a second and smaller outer diameter, but may not extend completely through lower region 304 (e.g., a blind hole having a closed bottom surface). Lower region 304 may be sized to accommodate a reserve chamber or reservoir 306, which maintains fluid discharged from electronically controlled valve assemblies 68. In particular, lower region 304 may have a plurality of openings 308 corresponding to the location of each electronically controlled valve assembly 68 for fluid communication between each electronically controlled valve assembly 68 and reservoir 306. Furthermore, additional openings 310 may extend between apertures 302 and central aperture 292 in order to provide an additional fluid flow path. Lower rod guide 264 may also include a collar portion 312 extending from lower region 304 for receipt of pressure tube 30 when in use as a dual-tube shock absorber, as previously described.

Lower rod guide 264 may accommodate square sealing ring 272, an upper seal ring 314, and a lower bushing 316 at central aperture 292 substantially above openings 310 so as not to interfere with flow characteristics. Square sealing ring 272 may be press-fit into an upper portion of lower rod guide 264, while upper seal ring 314 and bushing 316 may be press-fit into a lower portion of lower rod guide 264 about central aperture 292. Square sealing ring 272 may be a square or rectangular elastomeric ring (e.g., Kantseal) for preventing fluid passage between central apertures 282, 292 and channel/groove 284, 300. Seal ring 314 and bushing 316 accommodate for the sliding motion of piston rod 34 while also providing for a seal for piston rod 34. Seal ring 314 may be a T-seal or slip ring acting as a secondary seal by absorbing any radial clearance. Bushing 316 may behave as a collar or ledge for retaining seal ring 314 within central aperture 292.

Lower rod guide 264 may also include a cross-drilled hole 318 extending on a declining angle from central aperture 292 to outer diameter of upper region 294. Cross-drilled hole 318 may include a peripheral groove 320 for receipt of a check valve 322. In one example, check valve 322 may be an elastomeric, radially loaded seal for allowing fluid to escape central aperture 292.

Circuit board 266 may be disposed within channel 284 of upper rod guide 262 and may abut dowel pins 288 as previously discussed. In particular, circuit board 266 may include a plurality of integrally formed isolators 324 extending from opposite surfaces of circuit board 266 and aligned with dowel pins 288 for supporting circuit board 266. Circuit board 266 may be used to provide power to actuate electronically controlled valve assemblies 68 as previously described.

Retaining ring 270 may be arranged between upper rod guide 262 and lower rod guide 264 for retaining the various electronically controlled valve assemblies 68. For example, retaining ring 270 may be press-fit into lower rod guide 264 as shown, or may be secured to either upper or lower rod guides 262, 264, such as with an adhesive. Retaining ring 270 may have a substantially tubular body 328 comprising a central aperture 330 extending therethrough. Body 328 may have a U-shaped profile 332, such that a channel extends along a lower surface thereof for retaining electronically controlled valve assemblies 68. Furthermore, a plurality of apertures 334 may extend through body 328 so as to be concentrically aligned with apertures 302 in body 290 of lower rod guide 264. Retaining ring 270 may also include a plurality of standoffs or dowel pins 336 inserted into an upper surface thereof. Dowel pins 336 may be aligned with isolators 324 and dowel pins 288 for supporting circuit board 266.

Figure 5:
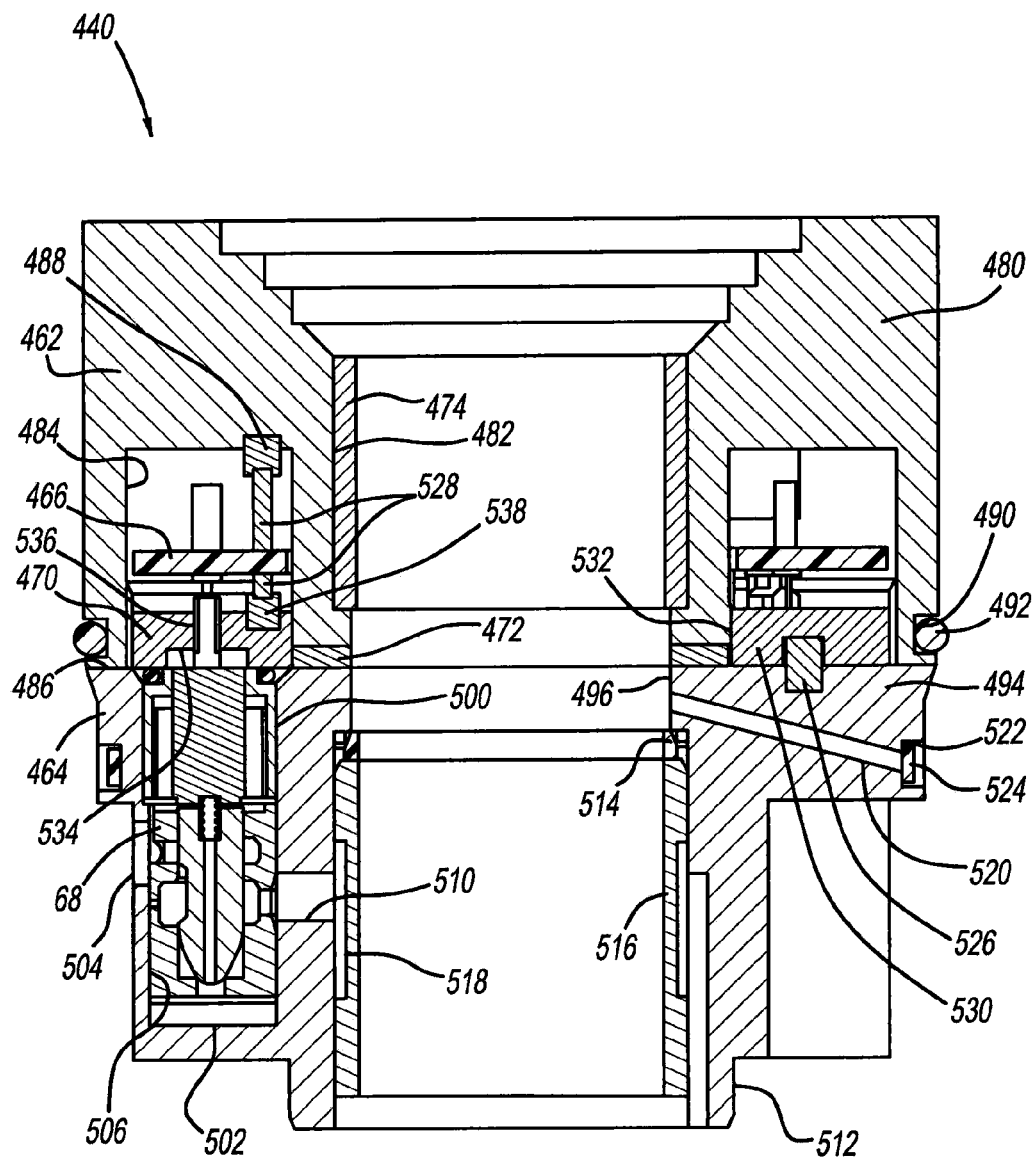
FIG. 5 is a cross-sectional view of a portion of a rod guide assembly in accordance with another embodiment of the present disclosure.

With reference now to FIG. 5, a rod guide assembly 440 is illustrated in greater detail. Rod guide assembly 440 can be used in place of rod guide assembly 240 in either the dual-tube shock absorber 20, 26 or mono-tube shock absorber 140 designs. For simplicity in description, only shock absorber 20 will be described hereinafter. Accordingly, various common parts will not be described in detail again, such as seal assembly 60 and piston rod 34. Rod guide assembly 440 comprises an upper rod guide 462, a lower rod guide 464, a circuit board 466, at least one of electronically controlled valve assemblies 68, a retaining ring 470, and a gasket 472. As should be understood, upper rod guide 462 and lower rod guide 464 may be manufactured from conventional forming processes, such as, powder metal forming, metal injection molding (MIM), or other casting/forming processing, as previously discussed.

Upper rod guide 462 may be assembled into shock absorber 20 or may be preassembled with lower rod guide 464 before installation into shock absorber 20. Upper rod guide 462 may have an upper bushing 474 assembled into a substantially tubular body 480 at a central aperture 482 thereof (e.g., press-fit) to accommodate for the sliding motion of piston rod 34 while also providing for a seal for piston rod 34. Upper bushing 474 may be shorter than those previously described, thereby allowing upper rod guide 462 to form a seat for receiving upper bushing 474. A concentric channel 484 extending from a lower surface 486 of body 480 may be sized for receipt of at least circuit board 466 and retaining ring 470 and may include a plurality of isolators 488 inserted into a bottom surface of channel 484. Isolators 488 may work to retain circuit board 466 at a predefined location within upper rod guide 462. A peripheral groove 490 may extend about a lower portion of upper rod guide 462 for receipt of a sealing ring or O-ring 492. In this way, body 480 may seal against an inner periphery of shock absorber 20.

Lower rod guide 464 may also have a substantially tubular body 494 comprising a central aperture 496 extending therethrough. A plurality of apertures 500 may be concentrically arranged about central aperture 496 so as to extend through body 494. Apertures 500 may be sized for receipt of electronically controlled valve assemblies 68. Although four (4) electronically controlled valve assemblies 68 are shown for use in rod guide assembly 440, any number of electronically controlled valve assemblies 68 may be provided. Apertures 500 may not extend completely through body 494 (e.g., a blind hole having a closed bottom surface 502).

Body 494 may have a plurality of openings 504 corresponding to the location of each electronically controlled valve assembly 68. The openings 504 may be arranged a distance above bottom surface 502, so as to provide a reserve chamber or reservoir 506 for maintaining fluid discharged from electronically controlled valve assemblies 68. The openings 504 may provide for fluid communication between each electronically controlled valve assembly 68 and reservoir 506. Furthermore, additional openings 510 may extend between apertures 500 and central aperture 496 in order to provide an additional fluid flow path. Lower rod guide 464 may also include a collar portion 512 extending from body 494 for receipt of pressure tube 30 when in use as a dual-tube shock absorber, as previously described.

Lower rod guide 464 may accommodate an upper seal ring 514, and a lower bushing 516 at central aperture 496. Lower bushing 516 may have a groove 518 extending about the outer diameter at a central region so as not to interfere with flow characteristics at openings 510. Upper seal ring 514 and bushing 516 may be press-fit into a lower portion of lower rod guide 464 about central aperture 496 so as to align groove 518 with openings 510. Seal ring 514 and bushing 516 accommodate for the sliding motion of piston rod 34 while also providing a sealing surface for piston rod 34. Seal ring 514 may be a T-seal or slip ring acting as a secondary seal by absorbing any radial clearance. Bushing 516 may behave as a collar or ledge for retaining seal ring 514 within central aperture 496.

Lower rod guide 464 may also include a cross-drilled hole 520 extending on a declining angle from central aperture 496, above upper seal ring 514, to outer diameter of body 494. Cross-drilled hole 520 may include a peripheral groove 522 for receipt of a check valve 524. In one example, check valve 524 may be an elastomeric, radially loaded seal for allowing fluid to escape central aperture 496. Furthermore, lower rod guide 464 may incorporate a plurality of dowel pins 526 extending upwardly into retaining ring 470 for preventing relative movement thereof.

Circuit board 466 may be disposed within channel 484 of upper rod guide 462 and may abut isolators 488 as previously discussed. In particular, circuit board 466 may include a plurality of integrally formed pins 528 extending from opposite surfaces of circuit board 466 and aligned with isolators 488 for supporting circuit board 466. Circuit board 466 may be used to provide power to actuate electronically controlled valve assemblies 68 as previously described.

Retaining ring 470 may be arranged between upper rod guide 462 and lower rod guide 464 for retaining the various electronically controlled valve assemblies 68. For example, retaining ring 470 may be press-fit into upper rod guide 462 as shown, or may be secured to either upper or lower rod guides 462, 464, such as with an adhesive. Retaining ring 470 may have a substantially tubular body 530 comprising a central aperture 532 extending therethrough. Body 530 may have a U-shaped profile, such that a channel 534 extends along a lower surface thereof for receiving electronically controlled valve assemblies 68. Furthermore, a plurality of apertures 536 may extend through body 530 so as to be concentrically aligned with apertures 500 in body 494 of lower rod guide 464. Retaining ring 470 may also include a plurality of isolators 538 inserted into an upper surface thereof. Isolators 538 may be aligned with pins 528 and isolators 488 for supporting circuit board 466.

Furthermore, gasket 472 may be arranged at an interface between upper rod guide 462 and lower rod guide 462. Gasket 472 may be an elastomeric ring for preventing fluid passage between central apertures 482, 496 and channel 484.

Figure 6:
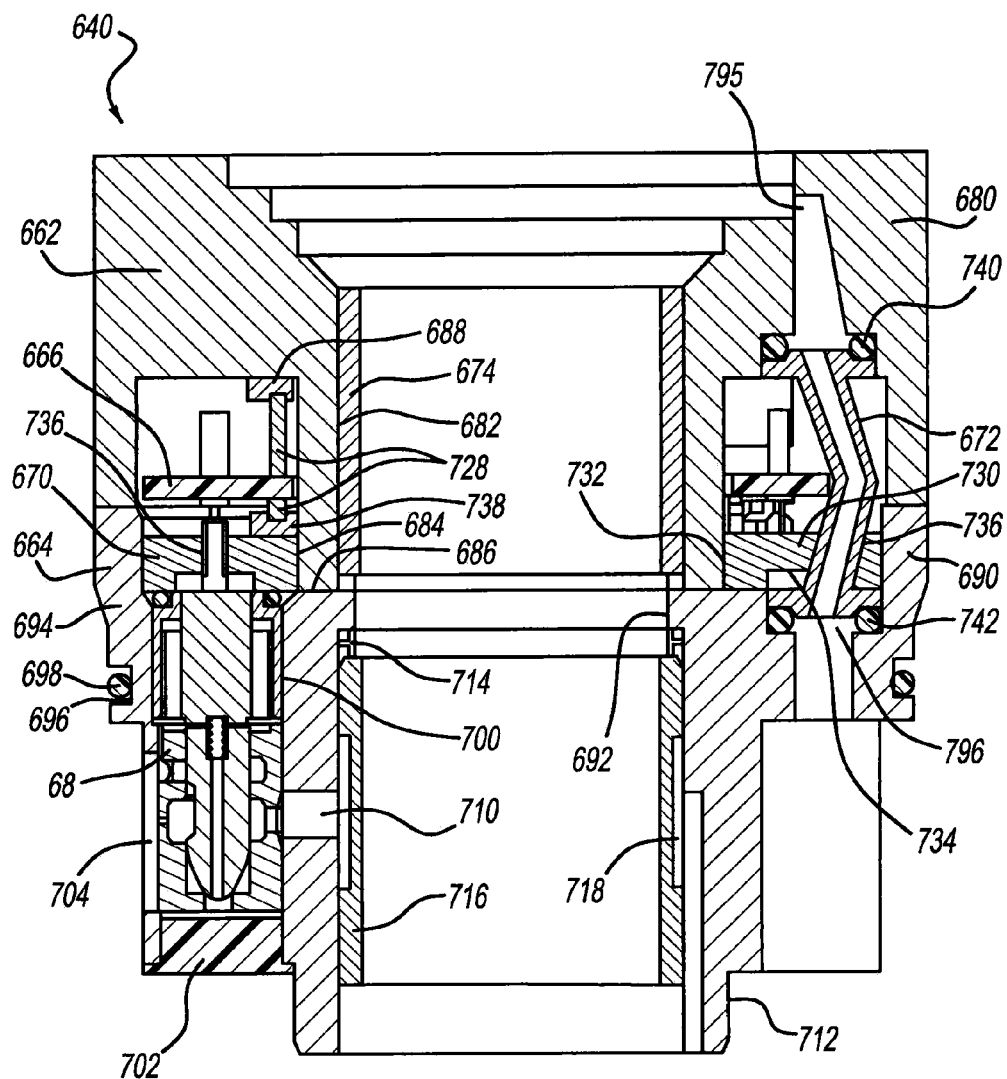
FIG. 6 is a cross-sectional view of a portion of a rod guide assembly in accordance with another embodiment of the present disclosure.

Referring now to FIG. 6, a rod guide assembly 640 is illustrated in greater detail. Rod guide assembly 640 can be used in place of rod guide assembly 440 in either the dual-tube shock absorber 20, 26 or mono-tube shock absorber 140 designs. For simplicity in description, only shock absorber 20 will be described hereinafter. Accordingly, various common parts will not be described in detail again, such as seal assembly 60 and piston rod 34. Rod guide assembly 640 comprises an upper rod guide 662, a lower rod guide 664, a circuit board 666, at least one of electronically controlled valve assemblies 68, a retaining ring 670, and a drainback tube 672. As should be understood, upper rod guide 662 and lower rod guide 664 may be manufactured from conventional forming processes, such as, powder metal forming, metal injection molding (MIM), or other casting/forming processing, as previously discussed.

Upper rod guide 662 may be assembled into shock absorber 20 or may be preassembled with lower rod guide 664 before installation into shock absorber 20. Upper rod guide 662 may have an upper bushing 674 assembled into a substantially tubular body 680 at a central aperture 682 thereof (e.g., press-fit) to accommodate for the sliding motion of piston rod 34 while also providing for a seal for piston rod 34. A concentric channel 684 extending from a lower surface 686 of body 680 may be sized for receipt of at least circuit board 666 and retaining ring 670 and may include a gasket or a plurality of isolators 688 inserted into a lower surface thereof. Isolators 688 may work to retain circuit board 666 at a predefined location within upper rod guide 662.

Lower rod guide 664 may also have a substantially tubular body 690 comprising a central aperture 692 extending therethrough. Body 690 may have an upper region 694 having a first outer diameter for sealing against an inner periphery of shock absorber 20. Upper region 694 may have a peripheral groove 696 for receipt of a sealing ring or O-ring 698. A plurality of apertures 700 may be concentrically arranged about central aperture 692 so as to extend through body 690. Apertures 700 may be sized for receipt of electronically controlled valve assemblies 68. Although four (4) electronically controlled valve assemblies 68 are shown for use in rod guide assembly 640, any number of electronically controlled valve assemblies 68 may be provided. Apertures 700 may extend completely through body 690 and may be closed by a plug 702 arranged at a lower surface of body 690.

Body 690 may have a plurality of openings 704 corresponding to the location of each electronically controlled valve assembly 68. Furthermore, additional openings 710 may extend between apertures 700 and central aperture 692 in order to provide a fluid flow path from central aperture 692 to exterior of lower rod guide 664. Lower rod guide 664 may also include a collar portion 712 extending from body 690 for receipt of pressure tube 30 when in use as a dual-tube shock absorber, as previously described.

Lower rod guide 664 may accommodate an upper seal ring 714, and a lower bushing 716 at central aperture 692. Lower bushing 716 may have a groove 718 extending about the outer diameter at a central region so as not to interfere with flow characteristics at openings 710. Upper seal ring 714 and bushing 716 may be press-fit into a lower portion of lower rod guide 664 about central aperture 692 so as to align groove 718 with openings 710. Seal ring 714 and bushing 716 accommodate for the sliding motion of piston rod 34 while also providing for a seal for piston rod 34. Seal ring 714 may be a T-seal or slip ring acting as a secondary seal by absorbing any radial clearance. Bushing 716 may behave as a collar or ledge for retaining seal ring 714 within central aperture 692.

Circuit board 666 may be disposed within channel 684 of upper rod guide 662 and may abut isolators 688 as previously discussed. In particular, circuit board 666 may include a plurality of integrally formed pins 728 extending from opposite surfaces of circuit board 666 and aligned with isolators 688 for supporting circuit board 666. Circuit board 666 may be used to provide power to actuate electronically controlled valve assemblies 68 as previously described.

Retaining ring 670 may be arranged between upper rod guide 662 and lower rod guide 664 for retaining the various electronically controlled valve assemblies 68. For example, retaining ring 670 may be press-fit into upper rod guide 662 as shown, or may be secured to either upper or lower rod guides 662, 664, such as with an adhesive. Retaining ring 670 may have a substantially tubular body 730 comprising a central aperture 732 extending therethrough. Body 730 may have a U-shaped profile, such that a channel 734 extends along a lower surface thereof for retaining electronically controlled valve assemblies 68. Furthermore, a plurality of apertures 736 may extend through body 730 for receipt of electronically controlled valve assemblies 68 and drainback tube 672. Retaining ring 670 may also include a gasket or a plurality of isolators 738 inserted into an upper surface thereof. Isolators 738 may be aligned with pins 728 and isolators 688 for supporting circuit board 666.

Drainback tube 672 may be arranged to extend between opening 795 of upper rod guide 662 and opening 796 of lower rod guide 662. Drainback tube 672 may be a metal injection molded or cast tube for allowing fluid flow between seal assembly 60 and reservoir chamber 50. Drainback tube 672 may be sealed with an O-ring 740 at the interface with upper rod guide 662 and with an O-ring 742 at the interface with lower rod guide 664.

Figure 7:
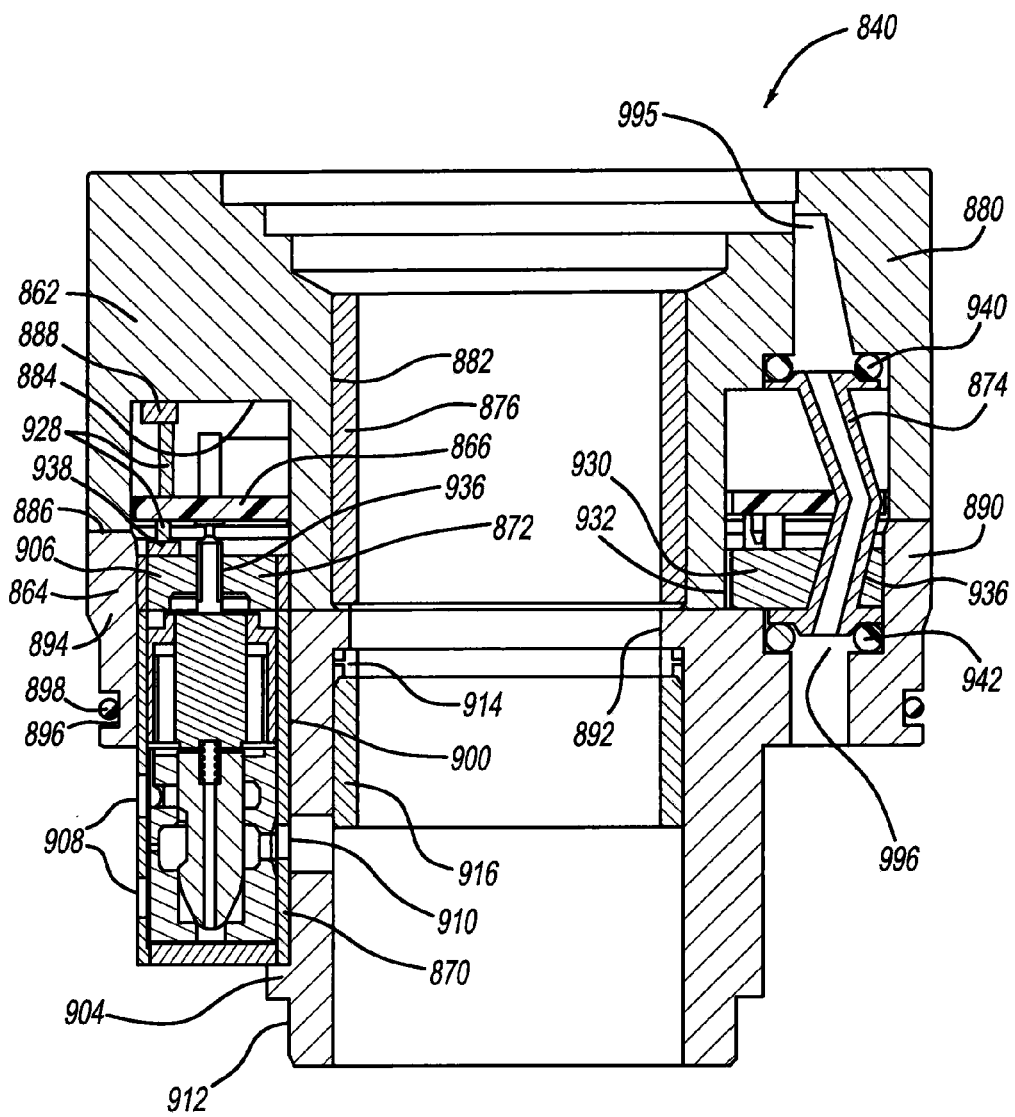
FIG. 7 is a cross-sectional view of a portion of a rod guide assembly in accordance with another embodiment of the present disclosure.

With reference now to FIG. 7, a rod guide assembly 840 is illustrated in greater detail. Rod guide assembly 840 can be used in place of rod guide assembly 640 in either the dual-tube shock absorber 20, 26 or mono-tube shock absorber 140 designs. For simplicity in description, only shock absorber 20 will be described hereinafter. Accordingly, various common parts will not be described in detail again, such as seal assembly 60 and piston rod 34. Rod guide assembly 840 comprises an upper rod guide 862, a lower rod guide 864, a circuit board 866, at least one of electronically controlled valves 68 arranged within a valve sleeve 870, a retaining ring 872, and a drainback tube 874. As should be understood, upper rod guide 862 and lower rod guide 864 may be manufactured from conventional forming processes, such as, powder metal forming, metal injection molding (MIM), or other casting/forming processing, as previously discussed.

Upper rod guide 862 may be assembled into shock absorber 20 or may be preassembled with lower rod guide 864 before installation into shock absorber 20. Upper rod guide 862 may have an upper bushing 876 assembled into a substantially tubular body 880 at a central aperture 882 thereof (e.g., press-fit) to accommodate for the sliding motion of piston rod 34 while also providing for a seal for piston rod 34. A concentric channel 884 extending from a lower surface 886 of body 880 may be sized for receipt of at least circuit board 866 and retaining ring 872 and may include a gasket or a plurality of isolators 888 inserted into a lower surface thereof. Isolators 888 may work to retain circuit board 866 at a predefined location within upper rod guide 862.

Lower rod guide 864 may also have a substantially tubular body 890 comprising a central aperture 892 extending therethrough. Body 890 may have an upper region 894 having a first outer diameter for sealing against an inner periphery of shock absorber 20. Upper region 894 may have a peripheral groove 896 for receipt of a sealing ring or O-ring 898. A plurality of apertures 900 may be concentrically arranged about central aperture 892 so as to extend through body 890. Apertures 900 may be sized for receipt of valve sleeve 870. Although four (4) sleeves 870 containing electronically controlled valve assemblies 68 are shown for use in rod guide assembly 840, any number of sleeves 870/electronically controlled valve assemblies 68 may be provided. Sleeve 870 may extend through body 890 and seat along an extending portion 904 of body 890. Sleeve 870 may also extend into retaining ring 872 at a portion extending into upper rod guide 862.

Sleeve 870 may be a deep drawn tube having a plurality of openings 908 corresponding to the location of each electronically controlled valve assembly 68. Furthermore, an additional opening 910 may extend between apertures 900 and central aperture 892 in order to provide a fluid flow path from central aperture 892 to exterior of lower rod guide 864. Lower rod guide 864 may also include a collar portion 912 extending from body 890 for receipt of pressure tube 30 when in use as a dual-tube shock absorber, as previously described.

Lower rod guide 864 may accommodate an upper seal ring 914, and a lower bushing 916 at central aperture 892 substantially above openings 910 so as not to interfere with flow characteristics. Upper seal ring 914 and bushing 916 may be press-fit into lower rod guide 864 about central aperture 892 to accommodate for the sliding motion of piston rod 34 while also providing for a seal for piston rod 34. Seal ring 914 may be a T-seal or slip ring acting as a secondary seal by absorbing any radial clearance. Bushing 916 may behave as a collar or ledge for retaining seal ring 914 within central aperture 892.

Circuit board 866 may be disposed within channel 884 of upper rod guide 862 and may abut isolators 888 as previously discussed. In particular, circuit board 866 may include a plurality of integrally formed pins 928 extending from opposite surfaces of circuit board 866 and aligned with isolators 888 for supporting circuit board 866. Circuit board 866 may be used to provide power to actuate electronically controlled valve assemblies 68 as previously described.

Retaining ring 872 may be arranged between upper rod guide 862 and lower rod guide 864 for retaining the various sleeves 870 and electronically controlled valve assemblies 68. Retaining ring 872 may extend partially into upper rod guide 862 as shown, or may be secured to either upper or lower rod guides 862, 864, in any known manner. Retaining ring 872 may have a substantially tubular body 930 comprising a central aperture 932 extending therethrough. Furthermore, a plurality of apertures 936 may extend through body 930 for receipt of electronically controlled valve assemblies 68 and drainback tube 874. Retaining ring 872 may also include a gasket or a plurality of isolators 938 arranged on an upper surface thereof. Isolators 938 may be aligned with pins 928 and isolators 888 for supporting circuit board 866.

Drainback tube 874 may be arranged to extend between opening 995 of upper rod guide 862 and opening 996 of lower rod guide 862. Drainback tube 874 may be a metal injection molded or cast tube for allowing fluid flow between seal assembly 60 and reservoir chamber 50. Drainback tube 874 may be sealed with an O-ring 940 at the interface with upper rod guide 862 and with an O-ring 942 at the interface with lower rod guide 864.

Figure 8:
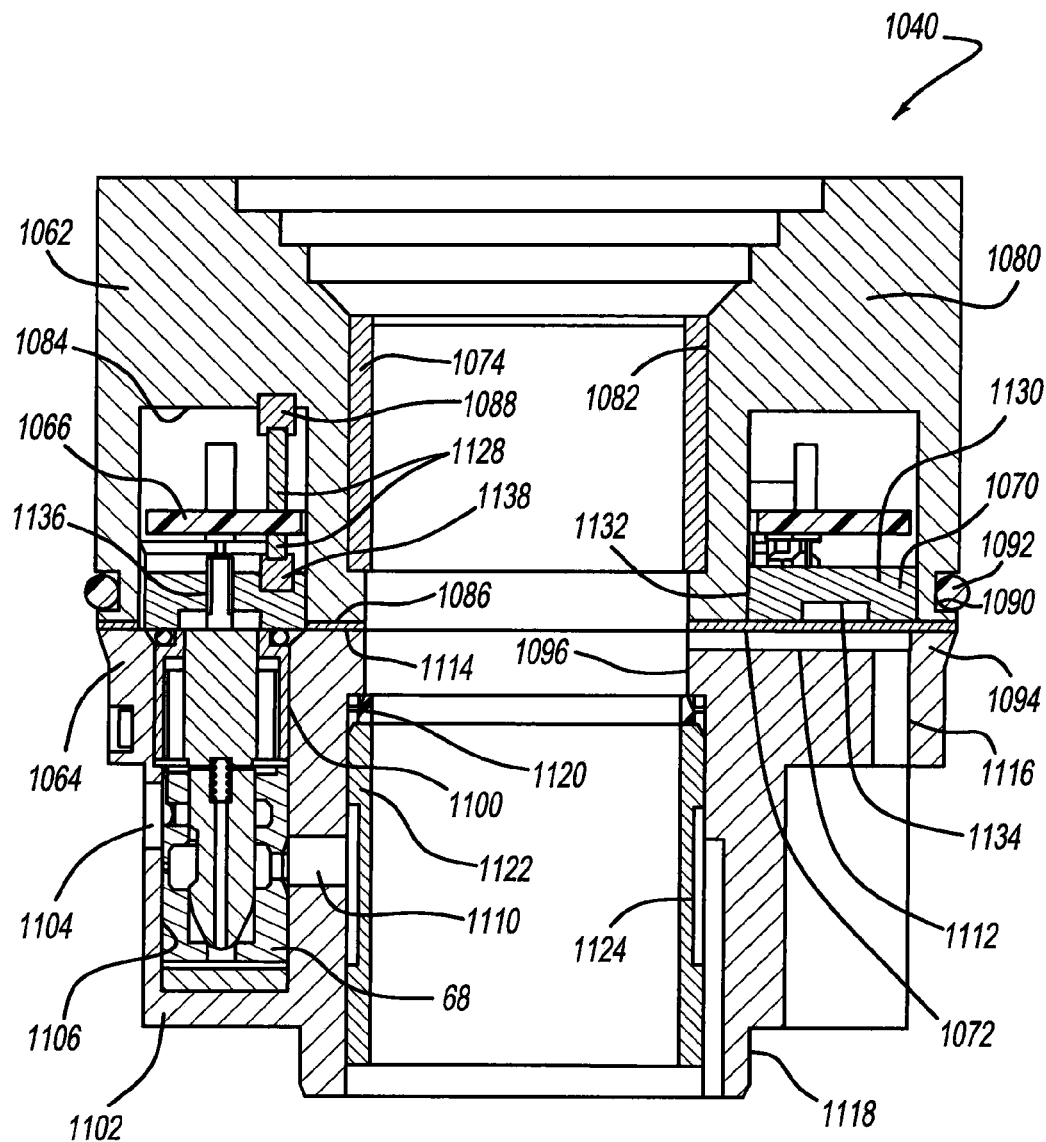
FIG. 8 is a cross-sectional view of a portion of a rod guide assembly in accordance with another embodiment of the present disclosure.

Referring now to FIG. 8, a rod guide assembly 1040 is illustrated in greater detail. Rod guide assembly 1040 can be used in place of rod guide assembly 840 in either the dual-tube shock absorber 20, 26 or mono-tube shock absorber 140 designs. For simplicity in description, only shock absorber 20 will be described hereinafter. Accordingly, various common parts will not be described in detail again, such as seal assembly 60 and piston rod 34. Rod guide assembly 1040 comprises an upper rod guide 1062, a lower rod guide 1064, a circuit board 1066, at least one of electronically controlled valve assemblies 68, and a retaining ring 1070. As should be understood, upper rod guide 1062 and lower rod guide 1064 may be manufactured from conventional forming processes, such as, powder metal forming, metal injection molding (MIM), or other casting/forming processing, as previously discussed.

Upper rod guide 1062 may be assembled into shock absorber 20 or may be preassembled with lower rod guide 1064 before installation into shock absorber 20. As shown, for example, an adhesive coating 1072 may be applied to an interface between upper rod guide 1062 and lower rod guide 1064. Adhesive coating 1072 may hold upper and lower rod guides 1062, 1064 together and may seal the joint interface without the need for a separate gasket member.

Upper rod guide 1062 may have an upper bushing 1074 assembled into a substantially tubular body 1080 at a central aperture 1082 thereof (e.g., press-fit) to accommodate for the sliding motion of piston rod 34 while also providing for a seal for piston rod 34. Upper bushing 1074 may be a short bushing, thereby allowing upper rod guide 1062 to form a seat for receiving upper bushing 1074. A concentric channel 1084 extending from a lower surface 1086 of body 1080 may be sized for receipt of at least circuit board 1066 and retaining ring 1070 and may include a gasket or a plurality of isolators 1088 inserted into a lower surface thereof. Isolators 1088 may work to retain circuit board 1066 at a predefined location within upper rod guide 1062. A peripheral groove 1090 may extend about a lower portion of upper rod guide 1062 for receipt of a sealing ring or O-ring 1092. In this way, body 1080 may seal against an inner periphery of shock absorber 20.

Lower rod guide 1064 may also have a substantially tubular body 1094 comprising a central aperture 1096 extending therethrough. A plurality of apertures 1100 may be concentrically arranged about central aperture 1096 so as to extend through body 1094. Apertures 1100 may be sized for receipt of electronically controlled valve assemblies 68. Although four (4) electronically controlled valve assemblies 68 are shown for use in rod guide assembly 1040, any number of electronically controlled valve assemblies 68 may be provided. Apertures 1100 may not extend completely through body 1094 (e.g., a blind hole having a closed bottom surface 1102).

Body 1094 may have a plurality of openings 1104 corresponding to the location of each electronically controlled valve assembly 68. The openings 1104 may be arranged a distance above bottom surface 1102, so as to provide a reserve chamber or reservoir 1106 for maintaining fluid at discharge from electronically controlled valve assemblies 68. The openings 1104 may provide for fluid communication between each electronically controlled valve assembly 68 and reservoir 1106. Furthermore, additional openings 1110 may extend between apertures 1100 and central aperture 1096 in order to provide an additional fluid flow path.

Lower rod guide 1064 may also include a radial slot 1112 for drainback. Radial slot 1112 may extend from central aperture 1096 through an upper surface 1114 of body 1094. A channel 1116 may extend transversely to radial slot 1112 so as to extend from a distal end of radial slot 1112 and through body 1094. Accordingly, radial slot 1112 and channel 1116 may provide fluid flow between seal assembly 60 and reservoir chamber 50. Lower rod guide 1064 may also include a collar portion 1118 extending from body 1094 for receipt of pressure tube 30 when in use as a dual-tube shock absorber, as previously described.

Lower rod guide 1064 may accommodate an upper seal ring 1120, and a lower bushing 1122 at central aperture 1096. Lower bushing 1122 may have a groove 1124 extending about the outer diameter at a central region so as not to interfere with flow characteristics at openings 1110. Upper seal ring 1120 and bushing 1122 may be press-fit into a lower portion of lower rod guide 1064 about central aperture 1096 so as to align groove 1124 with openings 1110. Seal ring 1120 and bushing 1122 accommodate for the sliding motion of piston rod 34 while also providing for a seal for piston rod 34. Seal ring 1120 may be a T-seal or slip ring acting as a secondary seal by absorbing any radial clearance. Bushing 1122 may behave as a collar or ledge for retaining seal ring 1120 within central aperture 1096.

Circuit board 1066 may be disposed within channel 1084 of upper rod guide 1062 and may abut isolators 1088 as previously discussed. In particular, circuit board 1066 may include a plurality of integrally formed pins 1128 extending from opposite surfaces of circuit board 1066 and aligned with isolators 1088 for supporting circuit board 1066. Circuit board 1066 may be used to provide power to actuate electronically controlled valve assemblies 68 as previously described.

Retaining ring 1070 may be arranged between upper rod guide 1062 and lower rod guide 1064 for retaining the various electronically controlled valve assemblies 68. For example, retaining ring 1070 may be press-fit into upper rod guide 1062 as shown, or may be secured to either upper or lower rod guides 1062, 1064, such as with an adhesive. Retaining ring 1070 may have a substantially tubular body 1130 comprising a central aperture 1132 extending therethrough. Body 1130 may have a U-shaped profile, such that a channel 1134 extends along a lower surface thereof for retaining electronically controlled valve assemblies 68. Furthermore, a plurality of apertures 1136 may extend through body 1130 so as to be concentrically aligned with apertures 1100 in body 1094 of lower rod guide 1064. Retaining ring 1070 may also include a plurality of isolators 1138 inserted into an upper surface thereof. Isolators 1138 may be aligned with pins 1128 and isolators 1088 for supporting circuit board 1066.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed is:

1. A shock absorber comprising:
    a housing;
    a piston rod slidably disposed within said housing;
    a first rod guide member secured within a first portion of said housing so as to be concentrically disposed about at least a portion of said piston rod;
    a second rod guide member secured within said housing adjacent said first rod guide member so as to be concentrically disposed about at least another portion of said piston rod;
    an electronically controlled valve assembly disposed within said second rod guide member and in communication with said first rod guide member;
    a seal separate from said first and second rod guide members directly engaging said piston rod;
    a circuit board removably secured within an annular channel in said first rod guide member, said circuit board in communication with said electronically controlled valve assembly; and
    a first bushing directly engaging said piston rod, said first bushing being disposed within an aperture defined by said first guide member.

2. The shock absorber according to claim 1, wherein said electronically controlled valve assembly includes a plurality of electronically controlled valves.

3. The shock absorber according to claim 2, wherein each of said plurality of electronically controlled valves extend in an axial direction of said piston rod.

4. The shock absorber according to claim 1, wherein said electronically controlled valve assembly comprises:
    a sleeve;
    an armature movably disposed within said sleeve; and
    a coil assembly disposed adjacent said armature.

5. The shock absorber according to claim 1, further comprising a retaining ring in direct contact with both of said first and second guide members securing said electronically controlled valve assembly in said second rod guide member.

6. The shock absorber according to claim 5, wherein an isolator is arranged on a first surface of said retaining ring, said isolator isolating a circuit board from said second rod guide member.

7. The shock absorber according to claim 1, further comprising a drainback tube providing fluid communication between an aperture in said first rod guide member and an aperture in said second rod guide member.

8. The shock absorber according to claim 1, further comprising an aperture in said second rod guide member extending from said piston rod to said housing, said aperture having a check valve arranged therein.

9. The shock absorber according to claim 1, wherein said second rod guide member includes a radial slot disposed on an upper surface thereof, said radial slot allowing for fluid communication between said piston rod and a longitudinally extending channel offset from said piston rod.

10. The shock absorber according to claim 1, further comprising a second bushing disposed adjacent said piston rod, said second bushing being disposed within an aperture defined by said second guide member.

11. The shock absorber according to claim 1, wherein said circuit board is entirely disposed within said annular channel in said first rod guide member.

12. A shock absorber comprising:
    a housing defining a first fluid chamber;
    a piston rod sliding in said housing, said piston rod defining a second fluid chamber;
    a rod guide for guiding said piston rod in said housing, said rod guide further comprising:
        an upper rod guide member;
        a lower rod guide member adjacent said upper rod guide member, each of said upper and lower rod guide members having a central aperture slidably receiving said piston rod;
        an electronically controlled valve assembly arranged within said lower rod guide member and in communication with said upper rod guide member, said electronically controlled valve assembly metering a fluid flow between said first fluid chamber and said second fluid chamber;
        a seal separate from said upper and lower rod guide members directly engaging said piston rod;
        a circuit board removably secured within an annular channel in said first rod guide member, said circuit board in communication with said electronically controlled valve assembly; and
        a first bushing directly engaging said piston rod, said first bushing being disposed within said aperture defined by said upper guide member.

13. The shock absorber according to claim 12, wherein said electronically controlled valve assembly includes a plurality of electronically controlled valves.

14. The shock absorber according to claim 13, wherein each said plurality of electronically controlled valves extend in an axial direction of said piston rod.

15. The shock absorber according to claim 12, wherein said electronically controlled valve assembly comprises:
    a sleeve;
    an armature movably disposed within said sleeve; and
    a coil assembly disposed adjacent said armature.

16. The shock absorber according to claim 12, further comprising a retaining ring in direct contact with both of said first and second rod guide members securing said electronically controlled valve assembly in said lower rod guide member.

17. The shock absorber according to claim 16, wherein one of an isolator and a gasket is arranged on a first surface of said retaining ring for isolating a circuit board from said lower rod guide member.

18. The shock absorber according to claim 12, further comprising a drainback tube providing fluid communication between an aperture in said upper rod guide member and an aperture in said lower rod guide member.

19. The shock absorber according to claim 12, further comprising an aperture in said lower rod guide member extending from said second fluid chamber to said first fluid chamber, said aperture having a check valve arranged therein.

20. The shock absorber according to claim 12, wherein said lower rod guide member includes a radial slot disposed on an upper surface thereof, said radial slot allowing for communication between said piston rod and a longitudinally extending channel offset from said piston rod.

21. The shock absorber according to claim 12, further comprising a second bushing disposed adjacent said piston rod, said second bushing being disposed within said aperture defined by said lower guide member.

22. The shock absorber according to claim 12, wherein said circuit board is entirely disposed within said annular channel in said first rod guide member.

\* \* \* \* \*